United States Patent [19]

Yoshimura et al.

[11] 3,886,111

[45] May 27, 1975

[54] HARDENABLE COMPOSITIONS

[75] Inventors: Hikoji Yoshimura, Fujisawa; Yuji Nakagawa; Hiroshi Yaginuma, both of Yokohama; Atsutane Kimi, Kamakura, all of Japan

[73] Assignee: Nippon Zeon Co., Ltd., Tokyo, Japan

[22] Filed: Dec. 21, 1973

[21] Appl. No.: 427,345

[30] Foreign Application Priority Data
Dec. 28, 1972 Japan.................................. 48-1044

[52] U.S. Cl... 260/31.2 N; 260/32.8 R; 260/33.2 R; 260/33.6 UA; 260/33.6 UB; 260/33.8 UA; 260/33.8 UB; 260/77.5 CR
[51] Int. Cl. ...................... C08f 45/36; C08g 51/36
[58] Field of Search .. 260/31.2 R, 31.2 N, 77.5 CR, 260/77.5 AP, 32.8 R, 33.6 UA, 33.8 UA

[56] References Cited
UNITED STATES PATENTS
3,714,110    1/1973    Verdol et al. ........... 260/77.5 CR X Primary Examiner—Lewis T. Jacobs
Attorney, Agent, or Firm—Sherman & Shalloway

[57] ABSTRACT

A hardenable composition comprising (A) a modified polypentadiene containing at least two hydroxyl groups in its molecular structure and of a hydroxyl value of 70–250, said modified polypentadiene being obtained by introducing the hydroxyl and acyloxy groups to the unsaturated double bonds of a liquid polypentadiene of a number average molecular weight of 300–5,000, (B) an organic diisocyanate compound and (C) a solvent which dissolves the modified polypentadiene and, in addition, is inert to the isocyanate group. The composition excels in coating and adhesive properties when cured.

9 Claims, No Drawings

HARDENABLE COMPOSITIONS

This invention relates to new hardenable compositions. More particularly, the invention relates to a hardenable composition composed of a modified polypentadiene, an organic diisocyanate compound and a solvent, in which the composition excels in coating and adhesive properties when cured.

The coatings formed by reacting an organic diisocyanate compound with a compound containing in its molecular structure at least two functional groups having active hydrogen, such as the hydroxyl or carboxyl groups, for example, the polyurethane resin coating, have been known to possess such excellent properties as abrasion resistance and surface smoothness. The coating material of this polyurethane resin, though possessing such excellent properties, is on the other hand, sensitive to water because of its possession of either the ether or ester bond in its polymer chain. And especially in the case of that possessing the ester bond, there is the shortcoming that this resin is noticeably inferior with respect to its resistances to acids and alkalis. Accordingly, for improving on these deficiencies, i.e., to obtain a coating not containing the ether or ester bond in the polymer chain, there has been found a method of using as the active hydrogen-containing compound a diene type polymer having hydroxyl groups at both ends, e.g., polybutadienediol (Japanese Pat. Pub. No. 8994/58.) However, while this method is effective for improving the water resistance, there are deficiencies with respect to the hardness and flexibility of the resulting coating. In addition, the adhesiveness to the surface of the material to which application has been made is inferior.

It has been recently found that by using as the compound having active hydrogen a polybutadiene containing at least 80% of the 1,2- configuration and having introduced to its both ends a functional group having active hydrogen there is provided a coating material demonstrating such excellent properties as fast drying speed, resistances to acids and alkalis, resistance to water and solvents, and abrasion resistance (Japanese Pat. Pub. No. 16823/71.) However, the coating material obtained by this method has some shortcomings with respect to the hardness of its coating, and thus was not entirely satisfactory.

To begin with, in evaluating the performances of a coating, flexibility and hardness are considered to be important factors along with such properties as water resistance, resistances to acids and alkalis, and abrasion resistance. However, flexibility and hardness are properties which are antinomical, and hence when attempts are made to enhance the flexibility, the hardness decline and, conversely, when attempts are made to improve the hardness, the flexibility declines. Hence, a polyurethane resin coating material in which these two properties have been fully improved has not yet to be found.

It is therefore a primary object of this invention to provide a composition that can form a coating in which the flexibility and hardness have been improved. Another object of the invention is to provide a new composition having a markedly improved adhesiveness on hardening.

We found that the foregoing objects could be achieved by using, as the compound having active hydrogen, instead of the hitherto used polybutadiene having functional groups at its both ends, a modified polypentadiene obtained by introducing hydroxyl and acyloxy groups to the unsaturated double bond contained in its molecular structure.

Thus, there is provided according to the present invention, as a composition that serves to achieve the foregoing objects, a composition comprising of (A) a modified polypentadiene containing at least two hydroxyl groups in its molecular structure and of a hydroxyl value of 70 – 250 obtained by introducing the hydroxyl and acyloxy groups to the unsaturated double bonds of a liquid polypentadiene of a number average molecular weight of 300 – 5,000, (B) an organic diisocyanate compound and (C) a solvent which dissolves the modified polypentadiene and, in addition, is inert to the isocyanate group.

The hydroxyl and acyloxy group-containing polypentadiene used as one of the constituents in the invention composition is prepared by introducing the hydroxyl and acyloxy groups to the unsaturated double bonds of a liquid polypentadiene having a number average molecular weight of 300 – 5,000, preferably 500 – 3,000, and having an iodine value according to the Wijs method of at least 100, preferably at least 150, obtained by polymerizing 1,3-pentadiene in the presence of either a homogeneous type Friedel-Crafts catalyst such as boron trifluoride, the complexes thereof, solubilized aluminum chloride and stannic tetrachloride, the Ziegler-type catalysts consisting essentially of the organoaluminum compounds and nickel compounds, the lithium type initiators, the sodium type initiators or the radical initiators. While there is imposed no restriction as to the method by which the polypentadiene to be used is prepared, favorably used for its demonstration of especially superior performance is that polymer containing at least 70% of the trans configuration obtained by the cationic polymerization using the homogeneous type Friedel-Crafts catalysts. If a polypentadiene whose molecular weight exceeds 5,000 is used, the workability or adhesiveness of the invention composition when using it as a coating material or an adhesive shows a marked decline, whereas if one whose molecular weight is less than 300 is used, the coating formability suffers. Further, when the iodine value of the polypentadiene is less than 100, the reaction for introducing the hydroxyl group does not take place easily because of the decrease in the unsaturated bonds of the polymer. Again, the polypentadiene to be used may be a copolymer with another comonomer to an extent that does not greatly impair the effects of the present invention. Suitably used as the comonomers in an amount of usually not more than 30% by weight are such compounds as butene-1, pentene-1, 1,3-butadiene, chloroprene, isoprene, 2-methyl-2-butene, 2,3-dimethyl-1,3-butadiene, cyclopentene, cyclopentadiene, diisobutylene, styrene and alpha-methylstyrene.

The modified polypentadiene used in the present invention, as indicated hereinbefore, is prepared by the introduction of the hydroxyl and acyloxy groups to the unsaturated double bonds contained in the molecular structure of the polypentadiene and is a polyfunctional polymer of a hydroxyl value of 70 – 250 containing at least two hydroxyl groups in its molecular structure. While there is imposed no particular restriction as to the method by which the modification reaction of introducing the hydroxyl and acyloxy groups is carried out, most commonly used is that of reacting polypentadiene with an organic peracid such as performic acid, peracetic acid, perbanzoic acid, etc., in either an aromatic hydrocarbon solvent such as benzene, toluene, xylene, etc., or a halogenated hydrocarbon solvent such as chloroform, carbon tetrachloride, etc.; or that of reacting polypentadiene in like manner with hydrogen peroxide and an organic monocarboxylic acid such as formic acid, acetic acid, propionic acid, benzoic acid, etc. When a mineral acid such as sulfuric acid, etc., is caused to be present in the reaction system during these reactions, at least a part of the double bonds contained in the polypentadiene molecule is alpha-glycolized in accordance with the amount of the mineral acid used (i.e., two hydroxyl groups are introduced simultaneously to at least a part of the double bonds). The degree to which the modified polypentadiene is alpha-glycolized can also be adjusted by hydrolyzing the acyloxy groups introduced into the molecule and converting same to the hydroxyl groups. However, a completely alpha-glycolized polypentadiene is not desirable, because such a polypentadiene is difficultly soluble in such solvents that are inert to the isocyanate group such as benzene, toluene ethyl acetate, butyl acetate and acetone, although it is soluble in the alcohols such as methanol, ethanol and propanol. Since the polypentadiene containing at least 0.3 acyloxy group, and preferably one acyloxy group, per hydroxyl group does not have this defect, such a polypentadiene is useful in the present invention. While there is imposed no particular restriction as to the acyloxy group that is to be introduced, usually used with preference is that of not more than 8 carbon atoms, especially preferred being the formyloxy, acetoxy and benzoyloxy groups.

This modified polypentadiene contains at least two hydroxyl groups in its molecular structure and has a hydroxyl value as measured in accordance with the acetic anhydride-pyridine method of 70 – 250, and preferably 100 – 200. As the hydroxyl value becomes greater, the polymer changes from a liquid to a solid state. A composition containing a modified polypentadiene having a hydroxyl value greater than 250, when coated, is inferior in its resistance to boiling water and resistances to acids and alkalis. On the other hand, when the composition is composed of a modified polypentadiene whose hydroxyl value is less than 70, there is not only a marked decline in the flexibility of the resulting coating, but also the resistances to water, acids, alkalis and solvents suffer. Hence, this also is undesirable. The modified polypentadiene used in this invention has a structure which differs from the conventional functional polymer having hydroxyl groups at its both ends in that it has hydroxyl groups attached to the unsaturated double bonds in the molecular structure. Inter alia, the modified polypentadiene obtained by the introduction of the hydroxyl and acyloxy groups to the double bonds of the side chain of a polypentadiene obtained by polymerizing 1,3-pentadiene in the presence of a homogeneous type Friedel-Crafts catalyst and containing the trans-1,2 and trans-1,4 bonds in abundance exhibits most excellent properties.

In carrying out the present invention, it is also possible to substitute for part of the modified polypentadiene (A) a polyfunctional polymer (A') having at ends of its molecular structure a functional group containing active hydrogen and of a number average molecular weight of 500 – 4,000. As these polyfunctional polymers, included are such, for example, as the polyether diols as polyoxypropylenediol, polyoxyethylenepolyoxypropylenediol and polyoxybutylenediol; the triols as polyoxyethylenetriol and polyoxypropylenetriol; the polyester diols obtained by the condensation of an alkylene oxide such as ethylene oxide or propylene oxide with a dibasic acid such as adipic acid; and the polybutadienediols. While the amount in which the foregoing polyfunctional polymers are mixed can vary over broad limits, a desirable amount, based on the total active hydrogen-containing compound, is not more than 50% by weight, preferably not more than 30% by weight, and most preferably not more than 20% by weight.

As the organic diisocyanate compounds used in the present invention, mention can be made of the aliphatic diisocyanates such as ethylene diisocyanate, ethylidene diisocyanate, propylene diisocyanate, butylene diisocyanate and hexamethylene diisocyanate; the alicyclic diisocyanates such as cyclopentylene diisocyanate and cyclohexylene diisocyanate; the aromatic diisocyanates such as 2,4-tolylene diisocyanate, 2,6-tolylene diisocyanate, 4,4'-diphenylmethane diisocyanate, 2,2'-diphenylpropane-4,4'-diisocyanate, 3,3'-dimethyldiphenylmethane-4,4'-diisocyanate, m- or p-phenylene diisocyanate and naphthylene diisocyanate; and the mixtures of these compounds. These organic diisocyanate compounds (B) are used as the rate of 0.3 – 4.0 equivalents, and preferably 0.7 – 3.0 equivalents, per equivalent of the hydroxyl groups contained in the modified polypentadiene (A) of the mixture of the modified polypentadiene and the other polyfunctional polymers (A').

Further, as noted hereinbefore, a solvent (C), which can dissolve the modified polypentadiene and is, in addition, inert to the isocyanate groups, is used. As specific examples of the foregoing solvent, included are the hydrocarbons such as benzene, toluene, xylene, and cyclohexane, the esters such as methyl acetate, ethyl acetate and butyl acetate; the ketones such as acetone, methyl ethyl ketone and methyl isobutyl ketone; the ethers such as methyl Cellosolve, ethyl Cellosolve and butyl Cellosolve; and the halogenated hydrocarbons such as chloroform, carbon tetrachloride and trichloroethylene. However, the lower alcohols such as methanol, ethanol, isopropanol and butanol cannot be used on account of their great reactivity with the organic diisocyanate compounds. While there is imposed no particular restriction as to the amount in which the solvent is used, it is necessary to use the solvent in an amount sufficient to dissolve the modified polypentadienes (A) or polyfunctional polymer (A') when these are solids, especially suitable being the use of the solvent at the rate of 70 – 900 parts by weight per 100 parts by weight of the total amount of the modified polypentadiene (and polyfunctional polymer) and organic diisocyanate compound.

The invention composition hardens as a result of the formation of the urethane bond between the hydroxyl group of the modified polypentadiene and the isocyanate group of the organic diisocyanate compound. While this reaction also proceeds at room temperature, it proceeds very promptly when the reactants are heated at 40° – 80°C. Hence, the invention composition can be used as a coating material by utilizing this characteristic. In this case, it can be used mixed with the natural drying oils, natural semidrying oils, synthetic drying oils, alkyd resins, phenol resins, etc. Again, the usually used desiccants, pigments, antioxidants, ultraviolet intercepting agents, etc., can also be admixed. The coating material obtained in this manner not only excels in such properties as resistances to water, acids, alkalis and solvents but also excels greatly in both its flexibility and hardness, which properties were hitherto considered to be in opposition to each other. Further, the invention composition can also be used as an adhesive, the adhesiveness exhibited being much greater than the other urethane resin adhesives that have been used heretofore. In addition, it can be used as a printing ink or as a surface treating agent of metallic plates and plastic sheets.

The following examples are given for more fully illustrating the invention.

REFERENCE EXPERIMENT

A 5-necked glass vessel fitted with a thermometer, a stirrer, a reflux condenser and a gas inlet line was charged with 68 grams of liquid polypentadiene of a number average molecular weight of 1,500, an iodine value of 360 and containing 80.5% of the trans configuration obtained by polymerizing 1,3-pentadiene using boron trifluoride-diethyletherate as catalyst, 68 grams of chloroform and 125 ml of formic acid, after which the inside of the vessel was purged with nitrogen. Next, 30% hydrogen peroxide in varying amounts as indicated in Table 1 was added dropwise at the rate of 2 ml per minute while maintaining the reaction system at 40°C. followed by carrying out the reaction for 4 hours at 40°C. after completion of the dropping. After completion of the reaction, 90°C. hot water was added to the reaction system and, after thorough stirring, the reaction system was cooled. The reaction product was then washed with an aqueous sodium hydrogen sulfite solution and then washed with water, this washing being repeated three times, after which the reaction product was dried for 24 hours at 60°C. under reduced pressure of 2 mmHg to obtain a modified polypentadiene. The so obtained modified polypentadiene was then measured for its hydroxyl value by the acetic anhydride-pyridine method [Yushi Kagaku Benran (Handbook of Oils and Fats Chemistry), p. 353, published by Maruzen Co., Ltd., April 20, 1973], and for its iodine value by the Wijs method (JIS K-5400). The results obtained are shown in Table 1.

Table 1

| Sample | A | B | C | D | E | F | G |
| --- | --- | --- | --- | --- | --- | --- | --- |
| 30 % Hydrogen peroxide (ml) | 30 | 40 | 50 | 60 | 80 | 100 | 200 |
| Hydroxyl value (mgKOH/g-polymer) | 40 | 70 | 100 | 140 | 210 | 230 | 260 |
| Iodine value (mgKOH/g-polymer) | 230 | 190 | 130 | 110 | 63 | 58 | 55 |
| State of room temperature | liquid | viscous liquid | solid | solid | solid | solid | solid |

When the infrared absorption spectrum of the modified polypentadiene was measured, absorptions due to the hydroxyl groups and absorptions due to the ester bond of the formyloxy groups were observed, and thus it can be seen that the hydroxyl and formyloxy groups have been introduced to both sides of the double bond. Again, it can be seen that as the amount of the hydrogen peroxide is increased, there is an increase in the hydroxyl value of the modified polypentadiene while, on the other hand, the iodine value decreases.

EXAMPLE 1

Modified polypentadiene dissolved in butyl acetate (Samples A – G) and hexamethylene diisocyanate were mixed in amounts such that two equivalents of the isocyanate groups would be contained per equivalent of the hydroxyl groups of the modified polypentadiene, after which further addition of butyl acetate was made to prepare a butyl acetate solution containing 40% by weight of a mixture of modified polypentadiene and hexamethylene diisocyanate. A test sheet of cold rolled soft steel thoroughly degreased and dried in advance was coated with this solution, using a 100 $\mu$ applicator, and left to stand for 24 hours at 20°C., followed by baking for 3 hours at 60°C. to form the coating. The properties of this coating were evaluated with the results shown in Table 2.

Table 2

| | Control product | Invention product | | | | | Control product |
| --- | --- | --- | --- | --- | --- | --- | --- |
| Experiment No. | 1 | 2 | 3 | 4 | 5 | 6 | 7 |
| Sample | A | B | C | D | E | F | G |
| coating thickness ($\mu$) | 19 | 21 | 20 | 19 | 20 | 23 | 21 |
| Pencil hardness | H | 4H | 5H | 6H | 7H | 5H | 4H |
| Flexibility (mm$\phi$) | 10 | 3 | 3 | 2 | 2 | 3 | 3 |
| Cross cut (%) | 40 | 90 | 100 | 100 | 100 | 100 | 100 |
| Water resistance *1 | failed | passed | passed | passed | passed | passed | passed |
| Boiling water resistance *2 | " | " | " | " | " | " | failed |
| Acid resistance *3 | " | " | " | " | " | " | " |
| Alkali resistance *4 | " | " | " | " | " | " | " |
| Solvent resistance *5 | " | " | " | " | " | " | passed |

*1 20°C., immersion for 2 days
*2 Immersion for 30 minutes
*3 3 % sulfuric acid, 20° C., immersion for 24 hours
*4 3 % aqueous caustic soda solution, 20°C., immersion for 24 hours
*5 toluene, 20°C., immersion for 2 days As compared with the fact that the coatings obtained from the Samples A and G were inferior with respect to their resistances to boiling water, alkalis and acids, it is seen that the coatings obtained from the invention composition not only were superior with respect to these properties but also demonstrated marked superiority with respect to both their hardness and flexibility, which properties are usually considered to be in antinomical.

EXAMPLE 2

Except that the modified polypentadiene (Samples A – G) and hexamethylene diisocyanate were mixed in amounts such that one equivalent of the isocyanate groups would be contained per equivalent of the hydroxyl groups of the modified polypentadiene, the experiment was operated exactly as in Example 1 to form the coatings, which were evaluated with the results shown in Table 3.

polybudatienediol, the hardness of the coating formed by the latter is seen to be not entirely satisfactory. On the other hand, when the invention composition is used, it is seen that notwithstanding the fact that it demonstrates a hardness unsurpassed heretofore, its flexibility is also exceedingly good.

EXAMPLE 3

Acetic acid or benzoic acid was used instead of the formic acid used for introducing the formyloxy group in repeating the hereinbefore-given Reference Experiment to prepare a modified polypentadiene introduced with the hydroxyl and acetoxy groups (Sample H) and a modified polypentadiene introduced with the hydroxyl and benzoyloxy groups (Sample I). The polypentadiene used was the same as that used in the Reference Experiment, and the resulting products had a hydroxyl value of 140 in both cases.

Table 3

|  | Control product | Invention product |  |  |  |  | Control product |
|---|---|---|---|---|---|---|---|
| Experiment No. | 8 | 9 | 10 | 11 | 12 | 13 | 14 |
| Sample | A | B | C | L | E | F | G |
| Coating thickness ($\mu$) | 21 | 20 | 19 | 18 | 20 | 21 | 20 |
| Pencil hardness | HB | 3H | 4H | 5H | 5H | 5H | 3H |
| Flexibility (mm$\phi$) | 10 | 3 | 2 | 2 | 2 | 3 | 3 |
| Cross cut (%) | 20 | 100 | 100 | 100 | 100 | 100 | 100 |
| Water resistance | failed | passed | passed | passed | passed | passed | passed |
| Boiling water resistance | '' | '' | '' | '' | '' | '' | failed |
| Acid resistance | '' | '' | '' | '' | '' | '' | '' |
| Alkali resistance | '' | '' | '' | '' | '' | '' | '' |
| Solvent resistance | '' | '' | '' | '' | '' | '' | passed |

CONTROL 1

The experiment was operated exactly as in Example 1, except that as the polymers containing the hydroxyl groups were used the modified polypentadiene (Samples C – E), a liquid 1,2-polybutadiene having hydroxyl groups at both its ends (hydroxyl value = 120, NISSO PB G - 1000, produced by Nippon Soda Co., Ltd., Japan) or a polyester type polyol (hydroxyl value = 205 – 221, DESMOPHEN 1100 produced by Bayer Company) to form the coatings. The properties of the so obtained coatings were evaluated with the results shown in Table 4.

Operating exactly as in Example 1, a mixture of either the Sample H or I and hexamethylene diisocyanate and butyl acetate was prepared. This mixture was used, and a coating was formed. On evaluation of the properties of the coating, it was found that the properties in the case of both the Samples H and I were very good, the pencil hardness being 6H and the flexibility being 2 mm diameter in both cases.

EXAMPLE 4

Modified polypentadiene (Samples C – E) was dissolved in butyl acetate, after which hexamethylene di- Table 4

|  | Invention product |  |  | Control product |  |
|---|---|---|---|---|---|
| Experiment No. | 3 | 4 | 5 | 15 | 16 |
| Sample | C | D | E | G-1000 | DESMOPHEN 1100 |
| Coating thickness ($\mu$) | 20 | 19 | 20 | 21 | 19 |
| Pencil hardness | 5H | 6H | 7H | H | 3H |
| Flexibility (mm$\phi$) | 3 | 2 | 2 | 3 | 2 |
| Cross cut (%) | 100 | 100 | 100 | 100 | 90 |
| Water resistance | passed | passed | passed | passed | passed |
| Boiling water resistance | '' | '' | '' | '' | failed |
| Acid resistance | '' | '' | '' | '' | '' |
| Alkali resistance | '' | '' | '' | '' | '' |
| Solvent resistance | '' | '' | '' | '' | passed |

The polyester type polyol, which has been favorably used in the past, though excelling relatively as far as its balance between the flexibility and hardness properties is concerned, is seen to be inferior with respect to its resistance to boiling water, acids and alkalis. Again, while these difficiencies of the polyester type polyol have been improved in the case of the 1,2- isocyanate was mixed therewith in an amount such that 2 equivalents of the isocyanate groups would be contained per equivalent of the hydroxyl groups of the modified polypentadiene, followed by the further addition of butyl acetate to prepare a butyl acetate solution containing 50% by weight of a mixture of the modified polypentadiene and hexamethylene diisocyanate.

This solution was applied to either a veneer of wood or sheet iron at the rate of 778 grams per square meter with a spatula followed by lamination and cold pressing (1 kg/cm², 24 hours) at 20°C. and thereafter hot pressing (1 kg/cm², 3 hours) at 60°C. to obtain a 3-ply wooden plywood and a 2-ply sheet iron laminate. The 3-ply wooden plywood was tested for its wood failure by the B Method prescribed by JAS (Japanese Agricultural Standards). On the other hand, the sheet iron laminate was tested in accordance with the ASTM D1002-53T for its tensile shear strength by pulling it at a speed of 10 mm/min. By way of comparison, similar tests were also carried out in the case where two classes of polyester type polyols (DESMOPHEN 300 of hydroxyl value 500 and DESMOPHEN 1100 of hydroxyl value of 205 – 221, produced by Bayer Company) were used instead of the modified polypentadiene. The results obtained are shown in Table 5.

Table 5

|  | Invention product | | | Control product | |
| --- | --- | --- | --- | --- | --- |
| Experiment No. | 17 | 18 | 19 | 20 | 21 |
| Sample | C | D | E | DESMOPHEN No. 300 | DESMOPHEN 1100 |
| 3-Plywooden plywood | | | | | |
| Wood failure in % | 100 | 100 | 100 | 100 | 0 |
| Sheet iron laminate | | | | | |
| Tensile sheet strength (kg/cmφ) | 105 | 116 | 111 | 26 | 0 |

It can be seen from these results that the invention composition is also valuable for use as an adhesive. While DESMOPHEN 300 is a polyester type polyol used as an adhesive, its adhesiveness when used with sheet iron is inadequate and, in the case of DESMOPHEN 1100, which is intended to be used as a coating material, the adhesiveness is practically nil. However, the invention composition can be used for both coating and adhesive purposes even though its makeup is the same. In addition, it demonstrates excellent properties unsurpassed heretofore.

We claim:

1. A hardenable composition comprising (A) a modified polypentadiene containing at least two hydroxyl groups in its molecular structure and of a hydroxyl value of 70 – 250, said modified polypentadiene being obtained by introducing the hydroxyl and acyloxy groups to the unsaturated double bonds of a liquid polypentadiene of a number average molecular weight of 300 – 5,000, said modified polypentadiene containing 0.3 – 1 acyloxy group per hydroxyl group, (b) an organic diisocyanate compound selected from the group consisting of the aliphatic diisocyanate, alicyclic diisocyanate, aromatic diisocyanate and the mixtures of at least two of these compounds, said organic diisocyanate compound is present in an amount such that 0.3 – 4.0 equivalents of the isocyanate groups are present per equivalent of the hydroxyl groups contained in said modified polypentadiene and (c) a solvent which dissolves the modified polypentadiene and, in addition, is inert to the isocyanate group.

2. A composition of claim 1 wherein up to 50% by weight of said modified polypentadiene (A) has been replaced with a polyfunctional polymer (A') of a number average molecular weight of 500 – 4,000 and having active hydrogen-containing functional groups at its end.

3. A composition of claim 2 wherein said organic diisocyanate compound (B) is contained in an amount such that 0.3 – 4.0 equivalents of the isocyanate groups are contained per equivalent of the hydroxyl groups contained in the modified polypentadiene (A) and the polyfunctional polymer (A').

4. A composition of claim 1 wherein said solvent is contained in an amount of 70 – 900 parts by weight per 100 parts by weight of the total amount of said modified polypentadiene (A) and organic diisocyanate compound (B).

5. A composition of claim 2 wherein said solvent is contained in an amount of 70 – 900 parts by weight per 100 parts by weight of the total amount of said modified polypentadiene (A), polyfunctional polymer (A') and organic diisocyanate compound (B).

6. A composition of claim 1 wherein said modified polypentadiene is derived a liquid polypentadiene containing at least 70% of the trans configuration and of an iodine value of at least 100 obtained by the cationic polymerization which uses as catalyst a homogeneous type Friedel-Crafts catalyst.

7. A composition of claim 1 wherein said acyloxy group is a member selected from the class consisting of the formyloxy, acetoxy and benzoyloxy groups.

8. A composition of claim 1 wherein said solvent is selected from the group consisting of the hydrocarbons, esters, ketones, ethers and halogenated hydrocarbons.

9. A composition of claim 1 wherein said polyfunctional polymer (A') is selected from the group consisting of the polyetherdiols, triols, polyesterdiols and polybutadienediols.

* * * * *